United States Patent
Zhang (10) Patent No.: US 10,700,965 B2
(45) Date of Patent: Jun. 30, 2020

(54) SYSTEM AND METHOD FOR A CONTROL PLANE REFERENCE MODEL FRAMEWORK

(71) Applicant: Huawei Technologies Co., Ltd., Shenzhen (CN)

(72) Inventor: Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 15/925,412

(22) Filed: Mar. 19, 2018

(65) Prior Publication Data
US 2018/0205640 A1    Jul. 19, 2018

Related U.S. Application Data (63) Continuation of application No. 14/245,830, filed on Apr. 4, 2014, now Pat. No. 10,291,515.
(Continued)

(51) Int. Cl.
*H04L 12/717* (2013.01)
*H04L 12/725* (2013.01)
(Continued)

(52) U.S. Cl.
CPC .............. *H04L 45/42* (2013.01); *H04L 41/12* (2013.01); *H04L 45/302* (2013.01); *H04W 28/0231* (2013.01); *H04L 45/64* (2013.01)

(58) Field of Classification Search
CPC ........ H04L 45/42; H04L 45/302; H04L 41/12
See application file for complete search history.

(56) References Cited

U.S. PATENT DOCUMENTS

| 8,346,816 B2 | 1/2013 | Son et al. | |
| 2011/0004457 A1* | 1/2011 | Haviv | ........................ G06F 8/61 703/21 |

(Continued)

FOREIGN PATENT DOCUMENTS

| CN | 101499851 A | 8/2009 |
| CN | 102075402 A | 5/2011 |

OTHER PUBLICATIONS

"OpenFlow Switch Specification" OpenFlow Switch Consortium, Version 1.3.1, Sep. 6, 2012, pp. 1-128.
(Continued)

*Primary Examiner* — Hoon J Chung
(74) *Attorney, Agent, or Firm* — Slater Matsil, LLP (57) ABSTRACT

Embodiments are provided for implementing control plane functionality to configure a data plane at a plurality of network nodes. A software defined topology (SDT) component is configured to determine a data plane logical topology indicating a plurality of selected nodes and a logical architecture connecting the selected nodes. The data plane logical topology enables traffic delivery for a service or virtual network for an end-customer or operator. A software defined networking (SDN) component is configured to interact with the SDT component and map the data plane logical topology to a physical network. The mapping includes allocating network nodes including the selected nodes and network resources which enable communications for the service or virtual network and meet QoS requirement. A software defined protocol (SDP) component is configured to interact with the SDN and define data plane protocol and process functionality for the network nodes.

23 Claims, 10 Drawing Sheets

Related U.S. Application Data (60) Provisional application No. 61/810,590, filed on Apr. 10, 2013.

(51) Int. Cl.
*H04L 12/24* (2006.01)
*H04W 28/02* (2009.01)
*H04L 12/715* (2013.01)

(56) References Cited

U.S. PATENT DOCUMENTS

| | | |
|---|---|---|
| 2011/0131252 A1 | 6/2011 | Son et al. |
| 2013/0097304 A1 | 4/2013 | Asthana et al. |
| 2013/0132536 A1 | 5/2013 | Zhang et al. |
| 2014/0153572 A1* | 6/2014 | Hampel .............. H04L 12/6418 370/392 |
| 2015/0365409 A1 | 12/2015 | Mohamed et al. |

OTHER PUBLICATIONS

G-Labs, Network virtualization in G-Lab COMCON (Slides), Jul. 23-24, 2012, 12th Wurzburg Workshiop on IP: ITG Workshop "Visions of Future Generation Network" (Euro View 2012), 8 pages.

Shimonishi, H., et al., "Virtualized Network Infrastructure Using OpenFlow," IEEE/IFIP Network Operations and Management Symposium Workshops (NOMS Wksps), Osaka, Apr. 2010, pp. 74-79.

Stallings, Software-Defined Networks and OpenFlow, Mar. 2013, The Internet Protocol, vol. 16, No. 1, p. 2-14.

Yap et al., "Blueprint for Intrducing Innovation Into the Wireless Networks We Use Every Day," OpenFlow, Oct. 12, 2009, 8 pages.

\* cited by examiner

SYSTEM AND METHOD FOR A CONTROL PLANE REFERENCE MODEL FRAMEWORK

This application is a continuation of U.S. Non-Provisional application Ser. No. 14/245,830 filed on Apr. 4, 2014 and entitled "System and Method for a Control Plane Reference Model Framework," which claims the benefit of U.S. Provisional Application No. 61/810,590 filed on Apr. 10, 2013, both of which are hereby incorporated by reference herein as if reproduced in their entireties.

TECHNICAL FIELD

The present invention relates to the field of network communications, and, in particular embodiments, to a system and method for a control plane reference model framework.

BACKGROUND

Software-defined networking (SDN) provides a mapping between logical topology requirements and physical infrastructure resources. Radio coordination is part of SDN for radio access networks (RANs). The SDN in RAN generally manages routing and traffic engineering (TE) to provide a forwarding path and required bandwidth or rate for traffic flow over each link over the path (multiple routes are also possible). The SDN in RAN also manages radio coordination to provide on-demand configuration of radio node specification, including the access link/backhaul link and the carrier. The on-demand configuration may include selecting built-in components with different specifications. The on-demand configuration can also include coordinating the mapping/allocation of the 5-tuple wireless resource (time/frequency/code/power/spatial) to active flows. However, as radio nodes functionality and RAN or other integrated network in general evolve, managing the control plane, such as in term of SDN framework, becomes challenging. There is a need for an improved control plane reference model and architecture for such networks including radio nodes and other nodes.

SUMMARY OF THE INVENTION

In accordance with an embodiment, a method by a network component for implementing control plane functionality to configure a data plane at a plurality of network nodes includes determining, using a software defined topology (SDT) component, a data plane logical topology indicating a plurality of selected nodes and a logical architecture connecting the selected nodes. The method further includes mapping, using a software defined networking (SDN) component, the data plane logical topology to a physical network, the mapping comprising allocating network nodes including the selected nodes and network resources which enable information delivery and communication for a service or virtual network and meet quality of service (QoS) requirement. The method further includes defining, using a software defined protocol (SDP) component, a data plane protocol including data plane process functionality for the allocated network nodes.

In accordance with another embodiment, a network component configured for implementing software defined topology (SDT) control plane functionality to configure a data plane at a plurality of network nodes includes at least one processor and a non-transitory computer readable storage medium storing programming for execution by the at least one processor. The programming includes instructions to determine, using a software defined topology (SDT) component, a data plane logical topology indicating a plurality of selected nodes, a logical architecture connecting the selected nodes at the data plane, and attributes of connections between the selected nodes. The data plane logical topology is determined according to a logical topology provided by a customer and enabling information delivery and communication of a service or virtual network. The programming includes further instructions to send information about the data plane logical topology to a software defined networking (SDN) component configured for mapping the data plane logical topology to a physical network.

In accordance with another embodiment, a network component configured for implementing software defined networking (SDN) control plane functionality to configure a data plane at a plurality of network nodes includes at least one processor and a non-transitory computer readable storage medium storing programming for execution by the at least one processor. The programming includes instructions to receive, from a software defined topology (SDT) component, information about a data plane logical topology determined according to a logical topology provided by a customer for enabling information delivery and communication of a service or virtual network. The programming includes further instructions to map the data plane logical topology to a physical network, the mapping comprising allocating network nodes including selected nodes and network resources which enable information delivery and communication for the service or virtual network and meet quality of service (QoS) requirement. The programming includes further instructions to send information about the mapping to a software defined protocol (SDP) component configured for defining a data plane protocol for the network nodes.

In accordance with another embodiment, a network component configured for implementing software defined protocol (SDP) control plane functionality to configure a data plane at a plurality of network nodes includes at least one processor and a non-transitory computer readable storage medium storing programming for execution by the at least one processor. The programming include instructions to receive, from a software defined networking (SDN) component, information about a mapping between a data plane logical topology and a physical network, the mapping comprising allocating network nodes and network resources which enable information delivery and communication for a service or virtual network and meet quality of service (QoS) requirement. The programming includes further instructions to define a data plane protocol including data plane process functionality for the allocated network nodes in the physical network corresponding to the mapped data plane logical topology. The instructions to define the data plane protocol include instructions to configure radio operation parameters for a radio node from the network nodes.

In accordance with another embodiment, a method for configuring a radio node at a data plane, the method comprising receiving, at the radio node, information indicating a set of data process functionality, workflow for handling and processing traffic, and corresponding parameters and status information as determined by a software defined protocol (SDP) control element. The received information enables communication and traffic delivery for a service or virtual network. The method further includes performing, by the radio node, an operation at the data plane according to the received information.

In accordance with yet another embodiment, a radio node component configurable at a data plane by one or more control plane components includes, at least one processor and a non-transitory computer readable storage medium storing programming for execution by the at least one processor. The programming includes instructions to receive information indicating a set of data process functionality, workflow for handling and processing traffic, and corresponding parameters and status information as determined by a software defined protocol (SDP) control element. The received information enables communication and information delivery for a service or virtual network. The programming includes further instructions to perform an operation of the radio node, at the data plane, according to the received information.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Current and future wireless networks or integrated wireless and non-wireless networks are expected to enable high flexibility, high efficiency, high openness and customization to customers (e.g., virtual network operators) and consumers. Currently, there is no systematic description of control plane functionality in wireless or integrated networks. Such networks also lack systematic description of control plane functionality workflow. Further, there is no definition of interface between the data plane (e.g., at a radio node level) and the different control plane components.

To enable such high-functioning wireless or integrated (combined wireless and non-wireless) networks, embodiments are provided herein to present a framework for a control plane reference model for such types of networks. The embodiments include identifying key control functionality of the control plane, and providing a control plane architecture to enable the control functionality of multiple control components. Additionally, interface between the control components are provided. Various workflows among the control components are also provided for exemplary scenarios.

To avoid the excessive complexity of Software-defined networking (SDN) and process complexity of network nodes in data plane, software defined topology (SDT) functionality is introduced to control plane to define service/application/virtual network (VN) specific data plane topology based on service logical topology before SDN. A service can be any network service provided by network resources, such as a data service, a voice service, a video service, other network based services, or combinations thereof. In order to provide a fully customized network, software defined data plane protocol (SDP) functionality is also introduced in control plane to define the service/application/VN specific data process. In control plane, in addition to a SDN functionality component, SDT and SDP components are also included. The embodiments also include identifying radio node functionality for improved or future wireless networks, and interface between the remote control plane and such radio nodes (e.g., at the data plane). This framework of reference model and interface design can be used in the systematic design, development of algorithms, and control mechanisms of future wireless or integrated network architecture.

Figure 1:
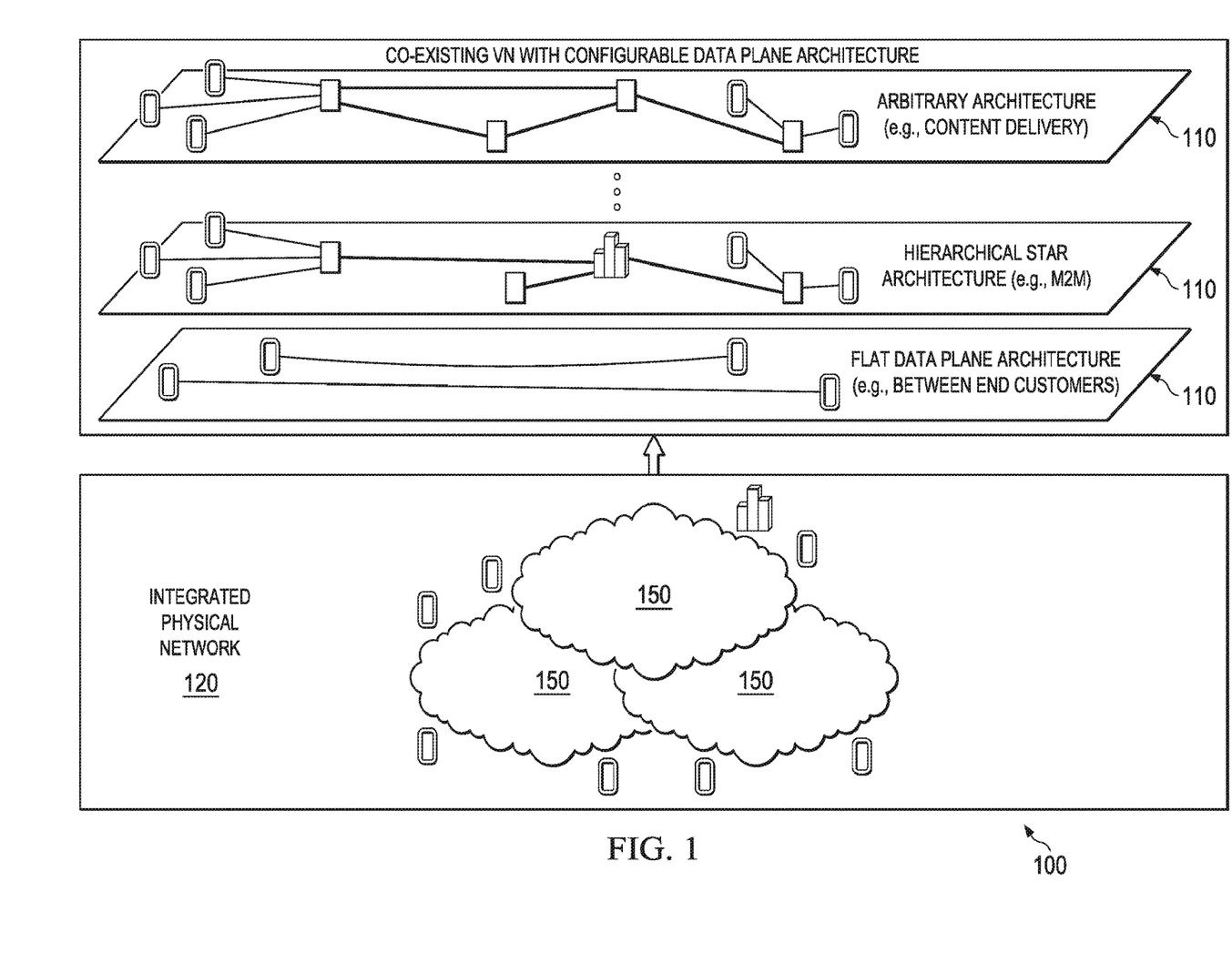
FIG. 1 illustrates a scenario of implementing multiple co-existing customized virtual networks at a control plane.

FIG. 1 illustrates using multiple co-existing customized virtual networks wo that can be implemented using the control plane functionality herein and further using integrated physical network resources 120. The integrated physical network resources may include multiple domains or sub-networks 150. The co-existing customized virtual networks wo achieved using the control plane functionality can be configured according to various logical architectures, including for example an arbitrary architecture such as for content delivery, a hierarchical star architecture such as for machine-to-machine (M2M) communications, and a flat data plane architecture such as for between end customers.

Figure 2:
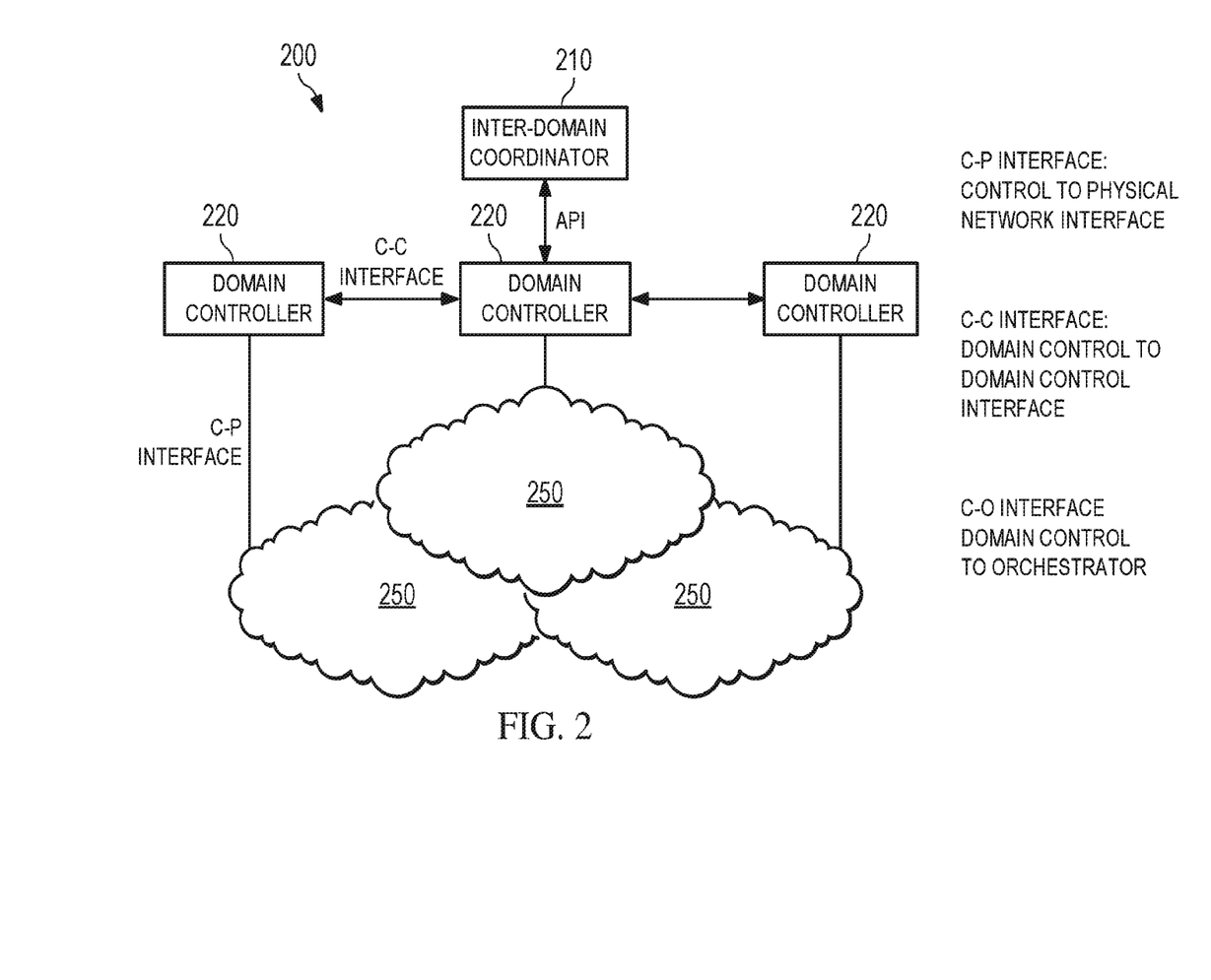
FIG. 2 illustrates an embodiment of a control plane architecture.

FIG. 2 shows an embodiment of a control plane architecture 200 that enables a configurable data plane architecture, such as the configurable data plane architecture wo, and allows the functioning and operation of the various configured VNs 102 at the data plane. The control plane architecture 200 is a logical control architecture that has a hierarchical structure to handle multiple geographic domains 250, which may be networks, sub-networks, or other types of network domains. A plurality of domain controllers 220 assigned to the different domains 250 are each configured with three control elements, including a software defined topology (SDT) component, a software defined network (SDN) component, and a software defined protocol (SDP) component. These control components may be implemented using software, hardware, or both. The physical implementation of the control functionality of the components can be implemented by a network entity or location (e.g., the domain controllers 220 corresponds to a node or data center), or alternatively can be virtual cloud based (e.g., in a distributed manner across a network or virtual network referred which is referred to as a cloud). The SDT component provides on-demand, configurable and customized logical data plane architecture. The SDN component provides on-demand customized resource management to meet the requirement of the defined data plane architecture. The SDP component provides on-demand, configurable and customized data plane process protocol that may be both radio related and non-radio related. The size of the domain 250 for each individual domain controller 220 can be different and can be dynamically configured. Additionally, an inter-domain coordinator 210 can be used to coordinate inter-domain control functionality between the different domain controllers 220. Each domain controller 220 can communicate with the inter-domain coordinator 210 via a first interface (e.g., via API), referred to in FIG. 2 as a domain control-to-orchestrator (C-O) interface. The domain controller 220 can communicate with another domain controller 220 via a second interface, referred to in FIG. 2 as a domain control-to-domain control (C-C) interface. The domain controller 220 also communicates with its respective domain via a third interface, referred to in FIG. 2 as a domain control-to-physical network (C-P) interface (or control plane-to-data plane (C-D) interface.

In an embodiment, the network nodes belong to a first layer, e.g., at the various domains 250, and are abstracted (or grouped) into virtual nodes at a second layer. Thus, the second layer comprises virtual nodes each being a group of multiple physical nodes at the first layer. The virtual nodes at the second layer are treated by the SDT/SDN/SDP components, e.g., in the domain controllers 220, as individual nodes having corresponding input and output parameters for control and configuration. As such, the network nodes at the first layer, which form the virtual nodes, can be transparent to the SDT/SDN/SDP components. Multiple abstraction levels may be used to group nodes into higher abstraction layer nodes. For example, the network nodes at the physical network layer may be grouped into virtual nodes at a first abstraction layer. The virtual nodes at the first abstraction layer may further be grouped into virtual nodes at a second abstraction layer, which may then be treated by the SDT/SDN/SDP components as individual nodes. This network layer abstraction simplifies handling and managing a large number of nodes in multiple networks or domains by the SDT/SDN/SDP components.

Figure 3:
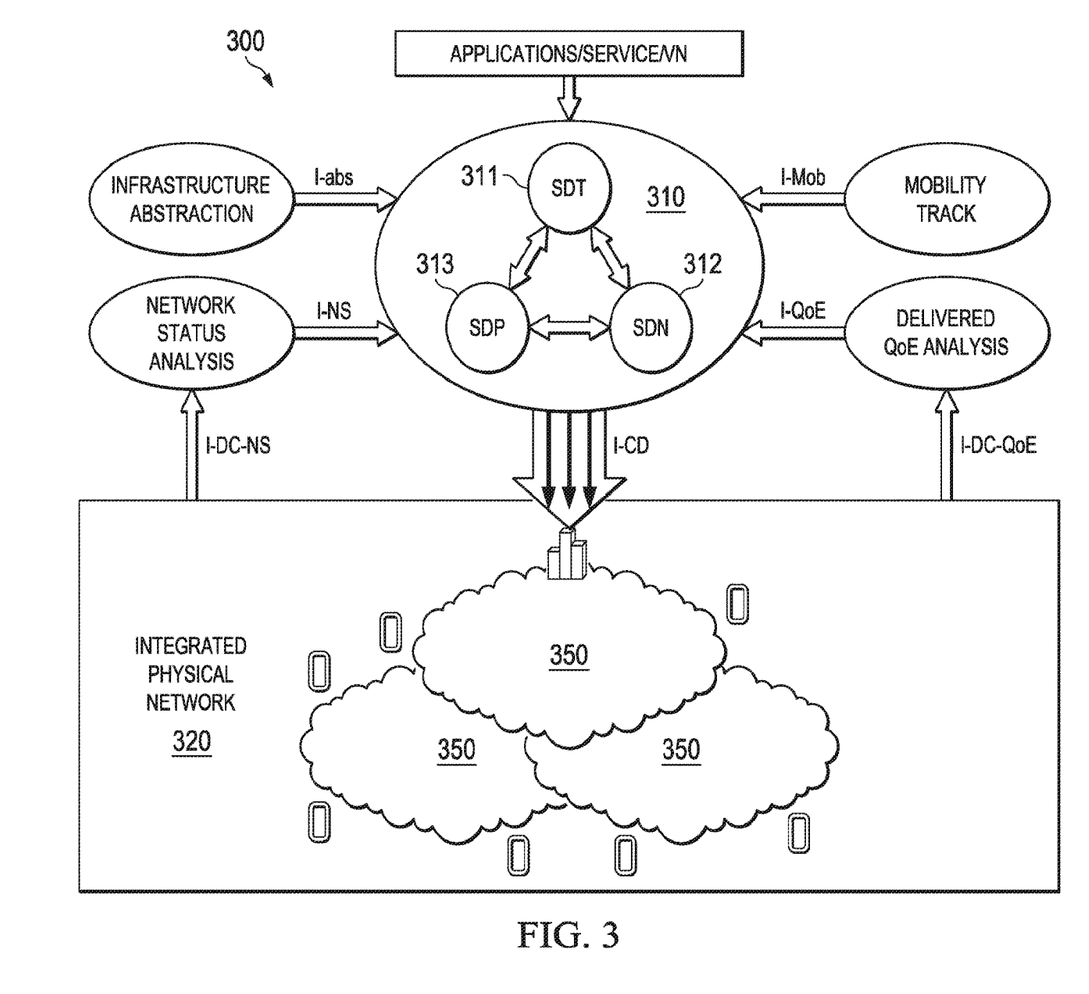
FIG. 3 illustrates an embodiment of control components within a domain controller.

FIG. 3 shows an embodiment of control components 300 within a domain controller 310. The control components 300 include a SDT component 311, a SDN component 312, and a SDP element 313 with respective control functionalities, as described above. The control components of the domain controller 310 provide the control functionality to the corresponding domain 320. The integrated physical network 320 may include or the corresponding domain may be a wireless network including radio nodes. The domain controller 310 may be managed or operated by an operator to handle, on-demand, communication and information delivery for a service or a VN. To perform the control functionality of the control components 300, the domain controller 310 receives input via API (application programming interface) from an application/service/VN operator to obtain service requirement (e.g., service logical topology, quality of service, preferred cost). The domain controller 310 also receives input information from the integrated physical network 320, including network status analysis information, infrastructure abstraction information, mobility track information (e.g., for mobile users), and/or quality of service (QoS) analysis information. The control elements at the domain controller 310 processes such information to provide a customized data plane for handling communications and data forwarding for a service or VN, by resource management such as path/bandwidth or rate allocation to meet the requirement of the defined data plane, and the data plane process protocol for forwarding/processing of associated traffic. The decisions from the control elements at the domain controller 310 are sent to the data plane (the network nodes) via the interface between control plane and data plane (I-CD). The interface between the applications/service/virtual network operator and control plane includes information, such as, service logical topology, application/traffic characteristics, end-customer mobility distribution, required service QoS, and/or other relevant information for enabling an applications/service/virtual network. The interface (I-Mob) between Mobility management/track and control plane includes information such as current location of end-customers, e.g., geographic location, location relative to network, and possible prediction of location. The interface (I-QoE) between control plane and Delivered QoE analysis includes QoE analysis information such as based on QoE information (e.g., rate, packet loss rate, black screen time). The interface (I-DC-QoE) between data plane and control plane includes the QoE information. The interface (I-abs) between control plane and infrastructure abstraction includes information such as effective spectra efficiency of mobile terminals. The interface (I-NS) between control pane and network status analysis includes information such as network load. The interface (I-DC-NS) between data plane and control plane includes information such as node load and packet drop rates. The interface (I-CD) includes information such as routing information, data process functionality, and work flow.

Figure 4:
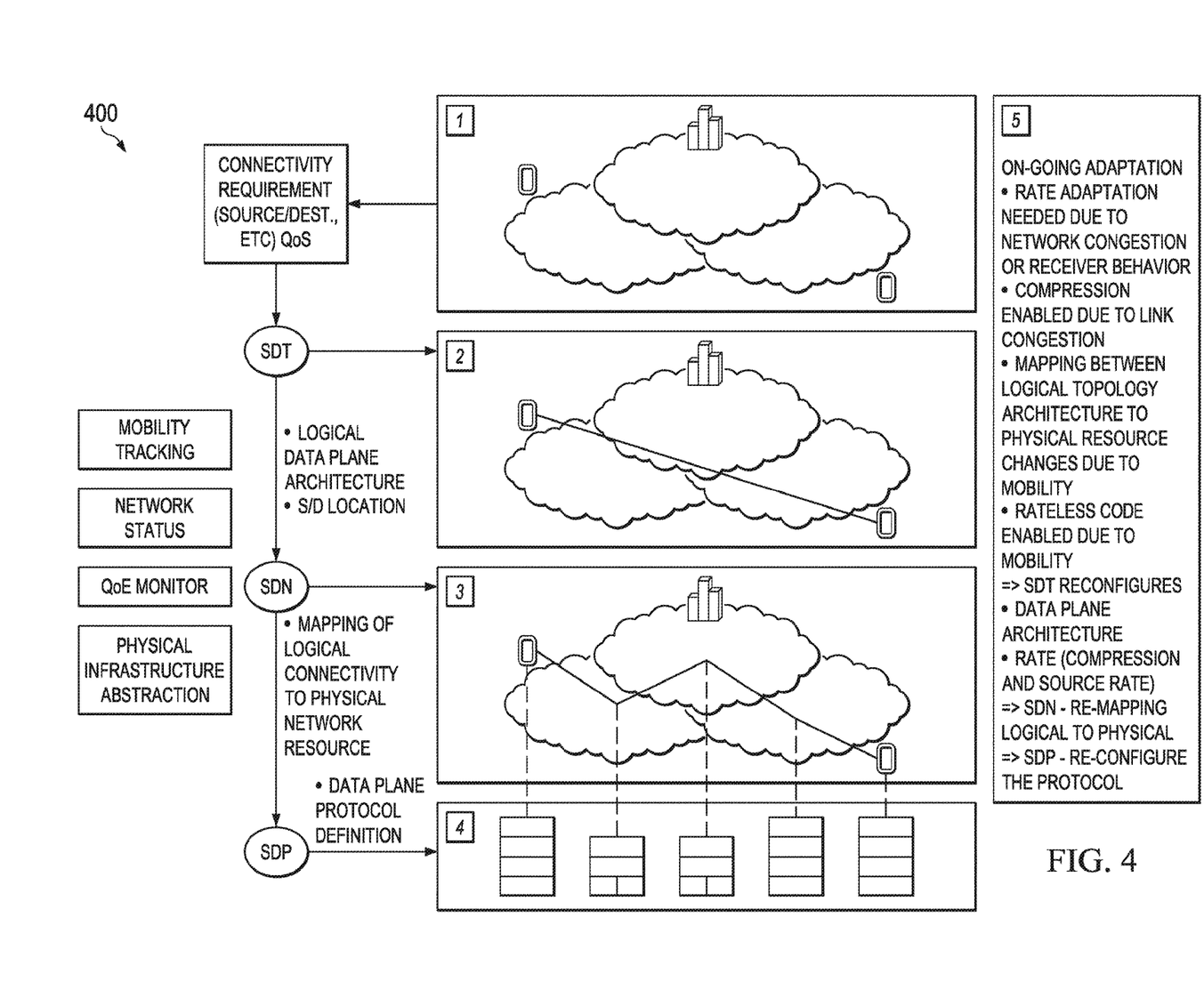
FIG. 4 illustrates an embodiment working flow for handling content transmission between end-to-end customers.

FIG. 4 shows an embodiment working flow 400 for handling content/information transmission between end-to-end customers. The working flow 400 is an exemplary scheme implemented by the control elements (SDT, SDN, and SDP), e.g., using the control plane architecture 200, to configure the virtual network for forwarding/processing/handling traffic between end-to-end customers. The SDT component determines the logical data plane topology architecture and source/destination locations based on factors, such as service/connectivity requirements, available network resource, QoS requirement, and/or other factors. As part of determining the logical topology for the data plane, the SDT component selects network elements or nodes and required service quality necessary to implement or enable the data plane (for a service or VN). For instance, the selected elements may be at least a source location/node and a destination location/node for handling content/information transmission between end-to-end customers/devices. The SDT also uses mobility tracking, network status, and quality of experience (QoE) information. The SDT provides the decision to the SDN component.

The SDN component maps the logical topology (from the SDT component) to a physical network resource. This process includes allocating network resources (e.g., one or more paths or routes, bandwidth) to meet the required data plane architecture and QoS requirement. The SDN component operation may involve multiple-handshake and negotiation between the control components and/or the inter-domain controllers. The SDN component operations may also use physical infrastructure abstraction information. According to the SDN component decision, the SDP component defines the data plane process functionality, e.g., as part of a data plane protocol, for each involved network node assigned by the SDN component, including radio nodes for wireless networks if considered. The control components interface with each other and negotiate for the best solution, for example to satisfy QoS with the minimum network resource used and/or maximize the operator/customer revenue. Additional on-going adaptation may also follow. For instance, the SDT component may need to reconfigure the logical data plane architecture to adapt to dynamic changes such as change in required end-to-end service/flow rate due to source rate adaptation to handle network congestion or receiver behavior at the nodes/end user's equipment, change in service/flow rate in some links on the forwarding path caused by compression due to link congestion, or change of source or destination location due to node/user mobility. The SDN needs to adapt to the modification of logical data plane topology to remap logical connectivity to physical network resource, and for reconfiguring (by the SDP component) the data plane protocol. In an embodiment, the SDT, SDN, and SDP iteratively or continuously implement their corresponding control functionality, thus adjusting dynamically to changes that may occur for a service or virtual network. This provides dynamic change to the data plane topology and necessary remapping into adjusted network resources according to the changes.

Figure 5:
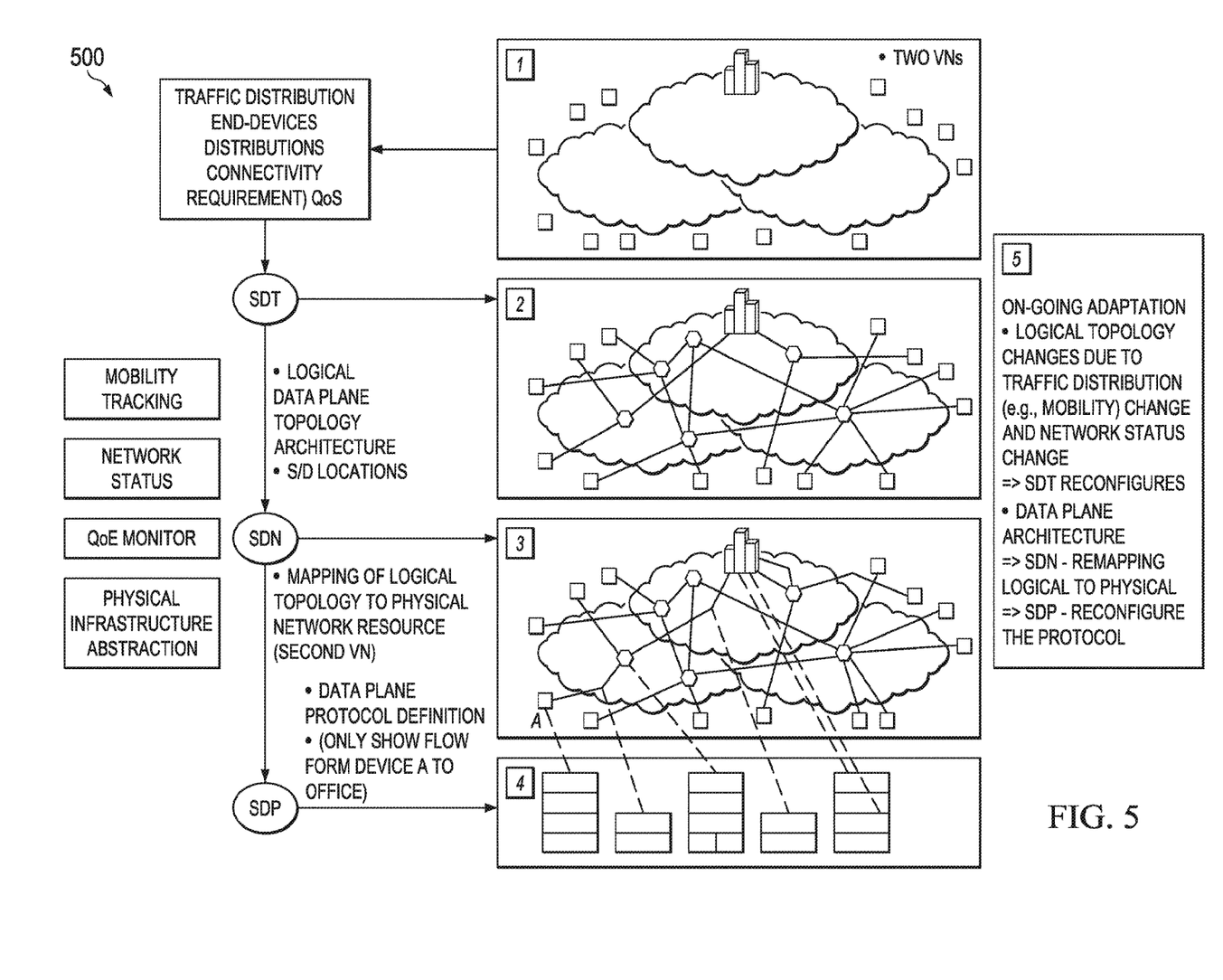
FIG. 5 illustrates an embodiment working flow for handling machine-to-machine (M2M) communications.

FIG. 5 shows an embodiment working flow 500 for handling machine-to-machine (M2M) communications. The working flow 500 is an exemplary scheme implemented by the control elements (SDT, SDN, and SDP), e.g., as in domain controller 310, to configure the data plane for forwarding and handling traffic for M2M communications, e.g., between machines such as sensors or meters absent of direct user involvement. The SDT component determines the logical data plane topology architecture, e.g., for a first VN, based on factors such as traffic characteristics and end-devices distribution, connectivity/QoS requirements, available network resource, and/or other factors. The SDT may also use mobility tracking, network status, and QoE information. The SDT provides the decision to the SDN component. The SDN component maps the logical topology (from the SDT component) to a physical network resource. This process includes allocating network resources (e.g., one or more paths or routes, bandwidth) to meet the required data plane architecture and QoS requirement. The SDN component operation may involve multiple-handshake and negotiation between the control components and/or the inter-domain controllers. The SDN component operations may also use physical infrastructure abstraction information. According to the SDN component decision, the SDP component defines the data plane process functionality, e.g., as part of a data plane protocol, for each involved network node assigned by the SDN component, including radio nodes for wireless networks if considered. The control components interface with each other and negotiate for the best solution, for example to satisfy QoS with the minimum network resource used and/or maximize the operator/customer revenue. Additional on-going adaptation may also follow, such as logical topology changes (by the SDT component) due to traffic distribution (e.g., mobility) change and network status change, remapping (by the SDN component) the logical topology to physical network resource, and reconfiguring (by the SDP component) the data plane protocol.

Figure 6:
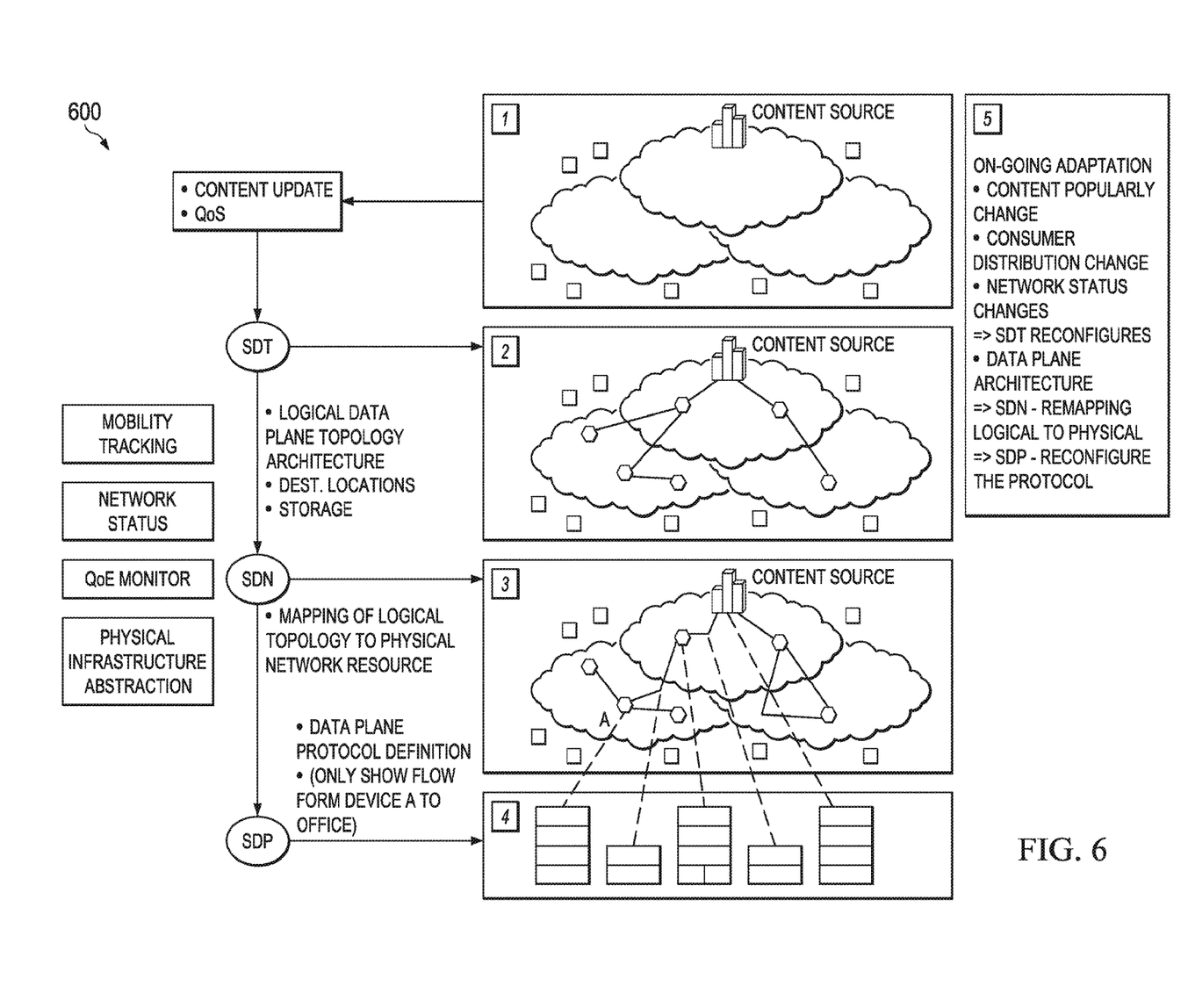
FIG. 6 illustrates an embodiment working flow for handling content dissemination into a content delivery network (CDN)

FIG. 6 illustrates an embodiment working flow 600 for handling content dissemination into a CDN. The working flow 600 is an exemplary scheme implemented by the control elements (SDT, SDN, and SDP), e.g., as in domain controller 310, to configure the data plane for dissemination of content traffic for a CDN. The SDT component determines the logical data plane topology architecture, including determining the locations of content storages based on factors, such as content popularity level, and QoS information. The SDT may also use mobility tracking, network status, and QoE information. The SDT provides the decision to the SDN component. The SDN component maps the logical topology to a physical network resource, e.g., including allocating network resources (e.g., one or more paths or routes, bandwidth) to meet the required data plane architecture and QoS requirement. The SDN component operation may involve multiple-handshake and negotiation between the control components and/or the domain controllers. The SDN component operations may also use physical infrastructure abstraction information. According to the SDN component decision, the SDP component defines the data plane process functionality, e.g., as part of a data plane protocol, for each involved network node, e.g., including radio nodes, assigned by the SDN component. The control components interface with each other and negotiate for the best solution, for example to satisfy QoS with the minimum network resource used and/or maximize the operator/customer revenue. Additional on-going adaptation may also follow, such as according to content popularity change, consumer distribution change, and network status changes. Such changes can trigger reconfiguration by the SDT component. Adaptation to data plane architecture may also trigger remapping between the logical topology and physical network resource (by the SDN component), and reconfiguration of the data plane protocol (by the SDP component).

Figure 7:
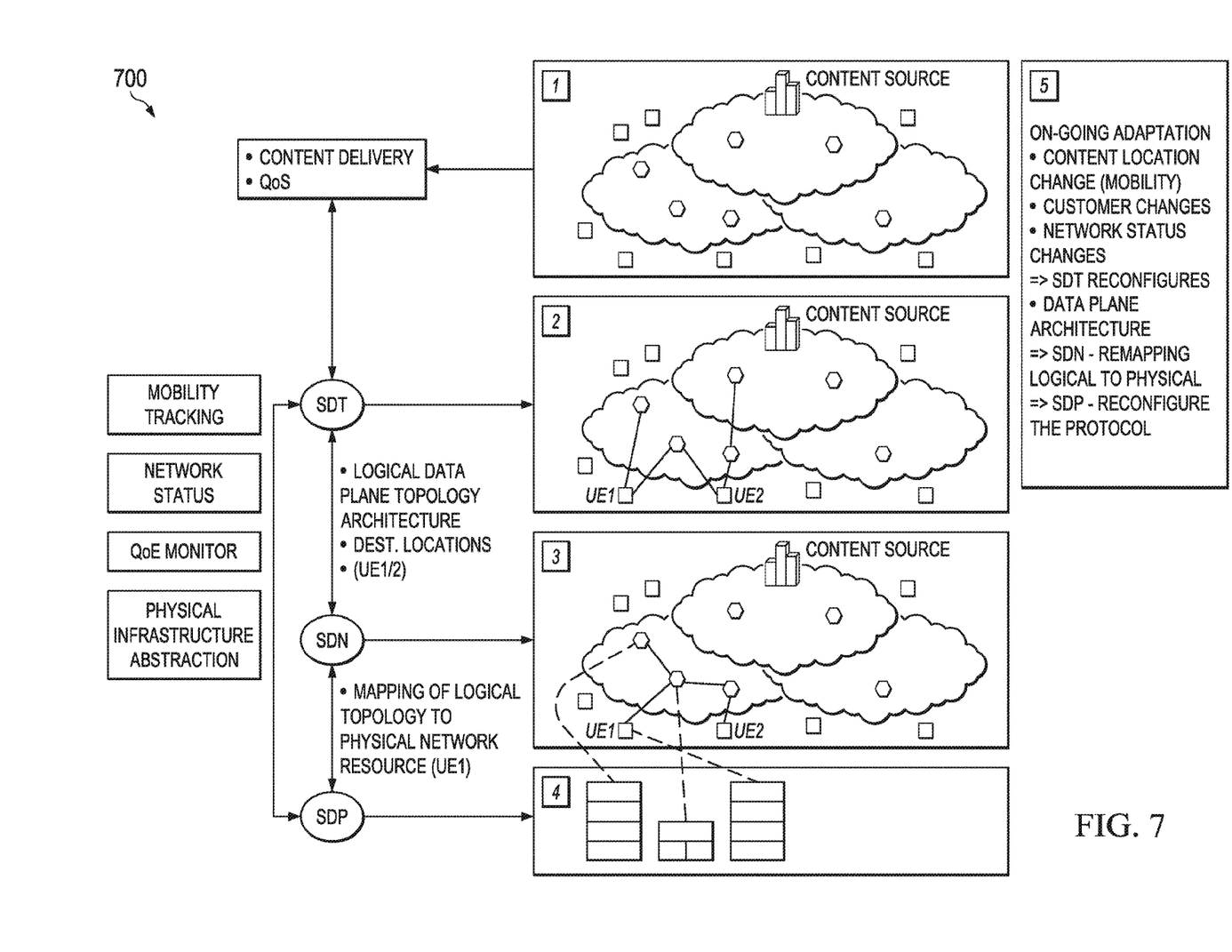
FIG. 7 illustrates an embodiment working flow for handling content delivery to customers in a CDN.

FIG. 7 illustrates an embodiment working flow 700 for handling content delivery to customers in a CDN. The working flow 700 is an exemplary scheme implemented by the control elements (SDT, SDN, and SDP), e.g., as in domain controller 310, to configure the data plane for dissemination of CDN content delivery to users (e.g., consumers of content). The SDT component determines the logical data plane topology architecture, including, determining the locations of content sources, and intended user (or content consumer) for delivery based on factors, including content delivery/request and QoS information. The SDT may also use mobility tracking, network status, and QoE information. The SDT provides the decision to the SDN component. The SDN component maps the logical topology to a physical network resource, e.g., including allocating network resources (e.g., one or more paths or routes, bandwidth) to meet the required data plane architecture and QoS requirement. The SDN component operation may involve multiple-handshake and negotiation between the control components and/or the domain controllers. The SDN component operations may also use physical infrastructure abstraction information. According to the SDN component decision, the SDP component defines the data plane process functionality, e.g., as part of a data plane protocol, for each involved network node, e.g., including radio nodes, assigned by the SDN component. The control components interface with each other and negotiate for the best solution, for example to satisfy QoS with the minimum network resource used and/or maximize the operator/customer revenue. Additional on-going adaptation may also follow, such as according to consumer location change (user mobility) and customer changes. Such changes can trigger reconfiguration by the SDT component. Adaptation to data plane architecture may also trigger remapping between the logical topology and physical network resource (by the SDN component), and reconfiguration of the data plane protocol (by the SDP component).

Figure 8:
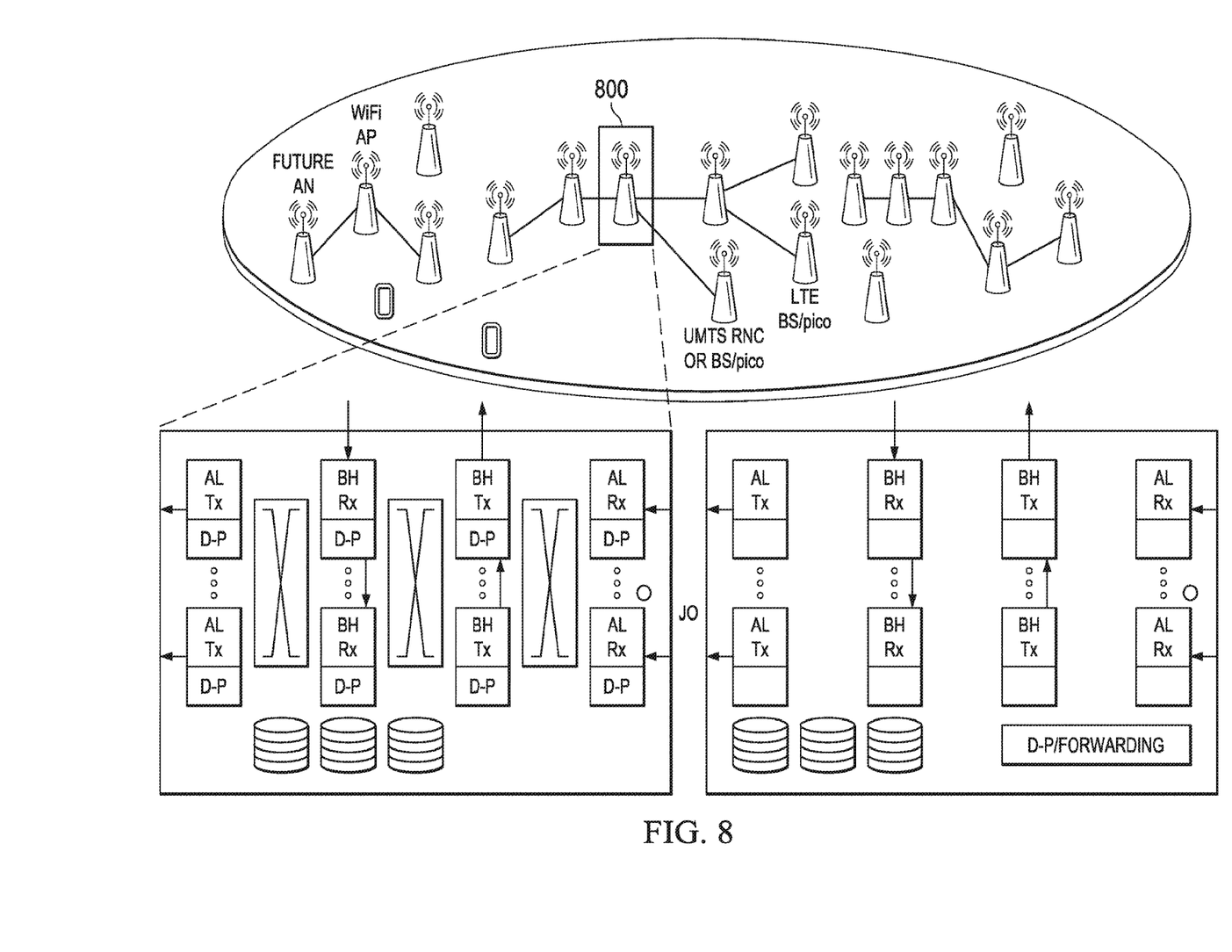
FIG. 8 illustrates an embodiment of a configurable and multi-functional radio node.

FIG. 8 illustrates an embodiment of a configurable and multi-functional radio node 800. The radio node 800 is one node or component of a wireless or integrated network that can be configured, e.g., at the data plane level, with suitable radio node functionality using the control plane architecture described above, for instance by the SDP component. The radio node 800 is equipped with single or multiple configurable or built-in radio transmitter(s)/receiver(s). A transmitter/receiver of the radio node 800 can be customized to support both access link and backhaul link communications, with configurable carrier band, antenna steer, antenna (steering, beam-width, and/or other antenna features). The radio node 800 can also be equipped with suitable storage capability. The radio node may also perform a switch function, to operate as a receiver connection for a selected transmitter, e.g., based on instructions from the control plane. The configurable radio node Boo can include one or more multiple wireless/fabric backhaul functions with configurable band RF. The configurable radio node 800 can also include narrow beam backhaul functionality, e.g., at a higher RF band, a routing functionality, one or more configurable access link functions, in-band or out-of-band sensor functionality, or combinations thereof. Multiple types of multi-functional radio nodes 800 may be configured depending on the functionality implemented.

Figure 9:
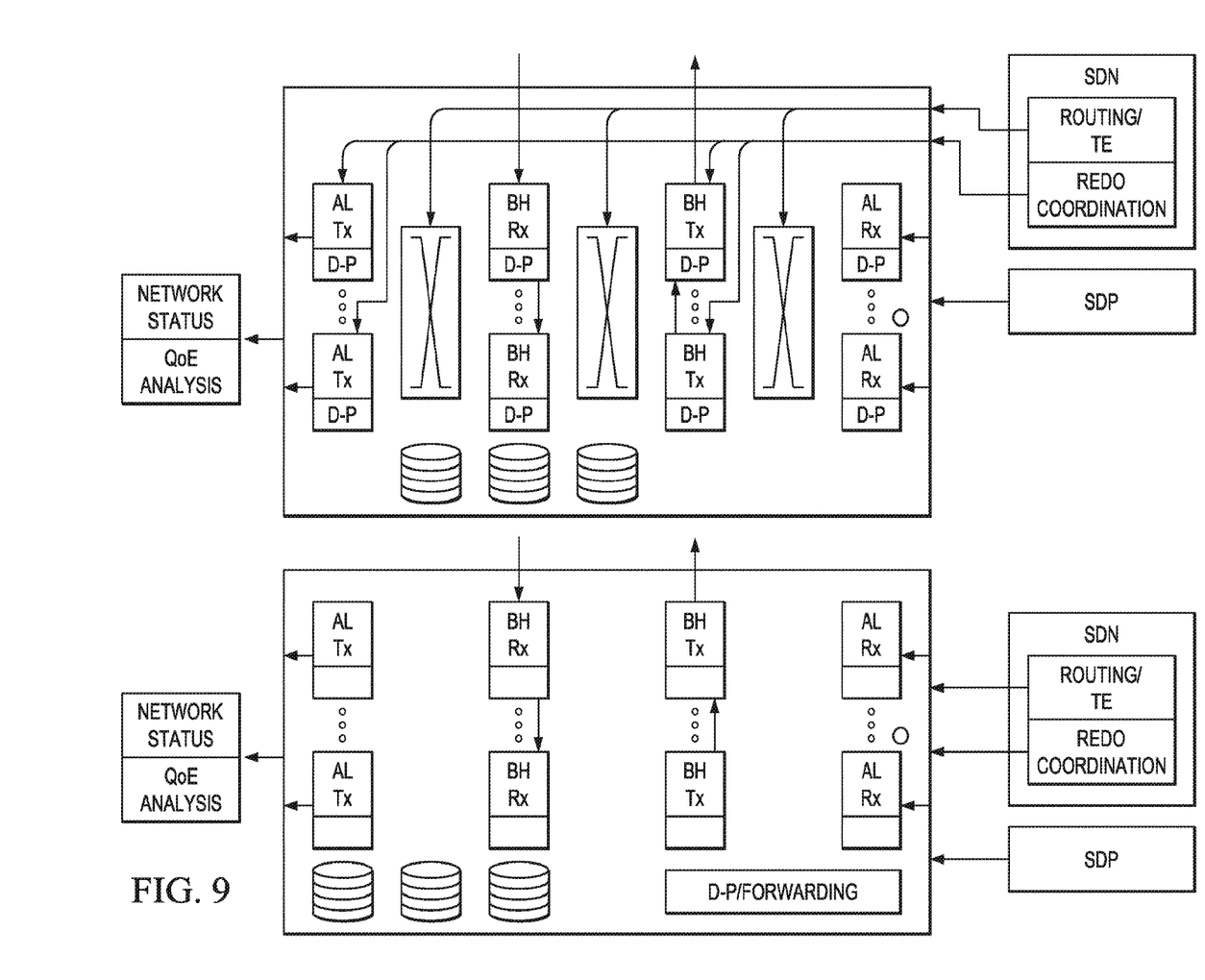
FIG. 9 illustrates an embodiment of an interface between the control plane and radio node.

FIG. 9 illustrates an embodiment of an interface 900 between the control plane and a radio node/network node with configurable functionality at the data plane, such as the radio node 800. The control plane can be centralized and remote with respect to the radio node, for instance at a domain controller component, as in domain controller 310, or may be virtual cloud based. The depth of centralized radio control and coordination may be configurable. For instance, fast adaptation required control (e.g., link adaptation, fast error recovery) may be locally controlled at the radio node. Slow adaptation required control (e.g., power control, spatial control, carrier coordination) may be remote (centralized) controlled at the control plane. The interface 900 may include a SDP-to-data plane logical interface that configures, for the radio node, the set of data process functionality, workflow for handling/processing traffic and corresponding parameters and status. The interface 900 may include a SDN-to-data plane logical interface that configures the forwarding rule and radio operation parameters for the radio node. The interface 900 may also include a SDT-to-data plane logical interface that configures the content storage and traffic rate and compression rule and traffic filtering, for the radio node.

Figure 10:
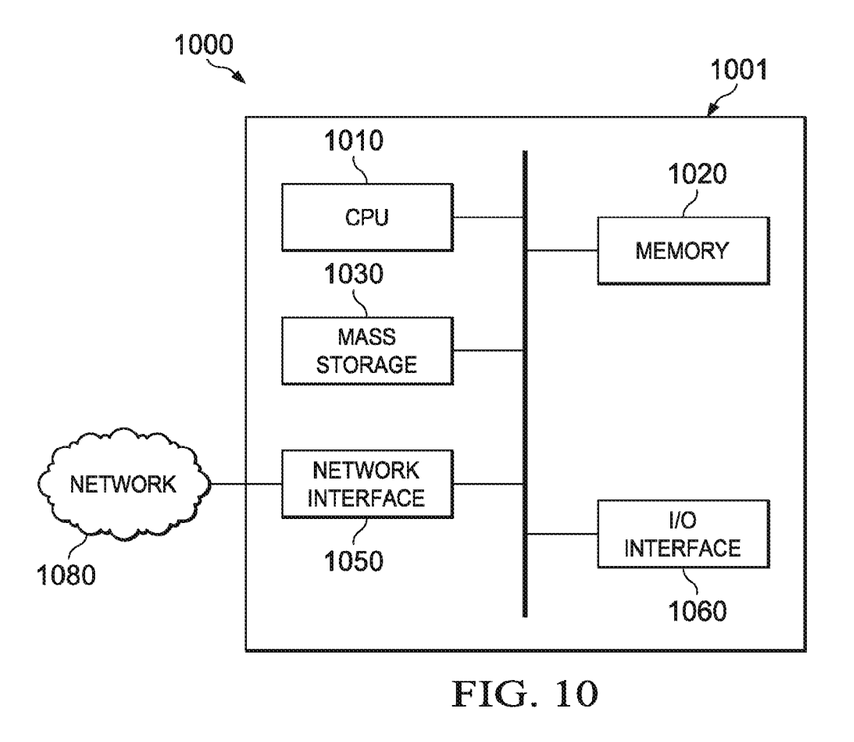
FIG. 10 is a diagram of an exemplary processing system that can be used to implement various embodiments.

FIG. 10 is a block diagram of an exemplary processing system 1000 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a network interfaces, storage interfaces, and the like. The processing unit 1001 may include a central processing unit (CPU) 1010, a memory 1020, a mass storage device 1030, and an I/O interface 1060 connected to a bus. The bus may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method in a network device for providing a customized virtual wireless network, the method comprising:

receiving, by a service-oriented virtual network auto-creation (SONAC) component of a computing device connected to a wireless network, service requirement data representing one or more service requirements;

receiving, by the SONAC component, input information from an integrated physical network, the input information including network status analysis information, infrastructure abstraction information, mobility track information, and quality of service (QoS) analysis information associated with the integrated physical network;

creating, by the SONAC component, a service customized virtual network (VN) according to the service requirement data, wherein creating the service customized VN comprises:

determining, by the SONAC component, a service-customized logical topology based on at least one of the network status analysis information, the infrastructure abstraction information, the mobility track information, or the QoS analysis information, mapping, by the SONAC component, the determined service-customized logical topology to physical network resources in the integrated physical network, and determining, by the SONAC component, an end-to-end data transport protocol for use by entities in the service-customized logical topology in accordance with availability of the physical network resources; and forwarding, by a network node in the integrated physical network, traffic using the end-to-end data transport protocol, the network node being one of a plurality of network nodes in the integrated physical network, the plurality of network nodes corresponding to the entities in the service-customized logical topology.

2. The method of claim 1, wherein determining the service-customized logical topology comprises communicating with a network functions virtualization (NFV)-enabled network node (NN) management component to request creation of logical functions.

3. The method of claim 1, further comprising instantiating a virtual and service-specific serving gateway (SGW) in response to receiving service requirement data for a machine-to-machine (M2M) service.

4. The method of claim 1, further comprising terminating a virtual and service-specific serving gateway (SGW) in response to receiving service requirement data for a machine-to-machine (M2M) service.

5. The method of claim 1, further comprising associating a virtual user equipment (UE) specific serving gateway (SGW) in response to receiving service requirement data for a registered UE.

6. The method of claim 5, further comprising creating a virtual user connectivity manager for a user equipment (UE) in response to receiving service requirement data for the UE.

7. The method of claim 1, further comprising:

interfacing, by the SONAC component, with at least one of a service and an application via an application programming interface (API) to initiate a service-customized virtual network (SCVN) according to a customer requirement; and interfacing, by the SONAC component, with the at least one of the service and the application via the API to update the SCVN according to a second customer requirement.

8. The method of claim 1, wherein further comprising automatically updating, by the SONAC component, the service customized VN via a control plane-user plane (C-U) interface.

9. The method of claim 8, wherein the service customized VN is updated via a virtual service specific serving gateway (v-s-SGW) in a user plane via the C-U interface.

10. The method of claim 1, wherein the SONAC component is coupled to a management plane via a management plane application programming interface (M-API), and wherein the SONAC component defines a management plane service topology.

11. The method of claim 10, wherein the management plane performs at least one of connectivity management, customer service management, infrastructure management, content and forwarding management, and data analysis management.

12. The method of claim 1, wherein the network status analysis information includes information about node loads and drop rates, wherein the infrastructure abstraction information includes information about effective spectra efficiency of UEs, wherein the mobility track information includes information about current locations and predicted locations of the UEs, and wherein the determining the service-customized logical topology, mapping the service-customized logical topology, and determining the end-to-end data transport protocol are performed in a closed loop.

13. A network system comprising:

a computing device including:

a processor; and a non-transitory computer readable storage medium storing programming for execution by the processor, the programming including instructions to:

receive service requirement data representing one or more service requirements at a service-oriented virtual network auto-creation (SONAC) component of the computing device;

receive input information from an integrated physical network, the input information including network status analysis information, infrastructure abstraction information, mobility track information, and quality of service (QoS) analysis information associated with the integrated physical network; and create a service customized virtual network (VN) according to the service requirement data, wherein the instructions to create the service customized VN comprises instructions to:

determine a service-customized logical topology based on at least one of the network status analysis information, the infrastructure abstraction information, the mobility track information, or the QoS analysis information, map the determined service-customized logical topology to physical network resources in the integrated physical network, and determine an end-to-end data transport protocol for use by entities in the service-customized logical topology in accordance with availability of the physical network resources; and a plurality of network nodes corresponding to the entities in the service-customized logical topology, at least one network node of the plurality of network nodes configured to:

forward traffic using the end-to-end data transport protocol.

14. The network system of claim 13, wherein the instructions to determine the service-customized logical topology include instructions to communicate with a network functions virtualization (NFV)-enabled network node (NN) management component to request creation of logical functions.

15. The network system of claim 13, wherein the programming further includes instructions to instantiate a virtual and service-specific serving gateway (SGW) in response to receiving service requirement data for a machine-to-machine (M2M) service.

16. The network system of claim 13, wherein the programming further includes instructions to terminate a virtual and service-specific serving gateway (SGW) in response to receiving service requirement data for a machine-to-machine (M2M) service.

17. The network system of claim 13, wherein the programming further includes instructions to associate a virtual user equipment (UE) specific serving gateway (SGW) in response to receiving service requirement data for a registered UE.

18. The network system of claim 17, wherein the programming further includes instructions to create a virtual user connectivity manager for a user equipment (UE) in response to receiving service requirement data for the UE.

19. The network system of claim 13, wherein the programming further includes instructions to interface between the SONAC component and at least one of a service and an application via an application programming interface (API) to initiate a service-customized virtual network (SCVN) according to a customer requirement.

20. The network system of claim 13, wherein the programming further includes instructions to automatically update the service customized VN via a control plane-user plane (C-U) interface.

21. The network system of claim 20, wherein the service customized VN is updated via a virtual service specific serving gateway (v-s-SGW) in a user plane via the C-U interface.

22. The network system of claim 13, wherein the SONAC component is coupled to a management plane via a management plane application programming interface (M-API), and wherein the SONAC component defines a management plane service topology.

23. The network system of claim 22, wherein the management plane performs at least one of connectivity management, customer service management, infrastructure management, content and forwarding management, and data analysis management.

* * * * *